Oct. 8, 1940. O. BAIER 2,217,398

ELECTRIC DISCHARGE TUBE

Filed Aug. 12, 1937

Patented Oct. 8, 1940

2,217,398

UNITED STATES PATENT OFFICE 2,217,398

ELECTRIC DISCHARGE TUBE

Otto Baier, Berlin, Germany, assignor to C. Lorenz Aktiengesellschaft, Berlin-Tempelhof, Germany, a company Application August 12, 1937, Serial No. 158,660
In Germany August 17, 1936

2 Claims. (Cl. 49—81)

The invention relates to electric discharge tubes of the kind in which the vessel thereof is composed of both metal parts and ceramic parts. In most cases a metal member forming part of the vessel is arranged at the same time to serve as one of the electrodes, such as the anode, for instance. An advantage of this arrangement is that the electrode so formed is well cooled.

The invention is concerned with the problem of interconnecting the metal parts and ceramic parts of the vessel by a seal or melt.

The simplest method would be to insert a metal part and a ceramic part one over the over and to seal their joint by applying a glass solder thereto and heating this. Experiments have shown however that a vacuum tight sealing is not insured in this way.

Figure 1:
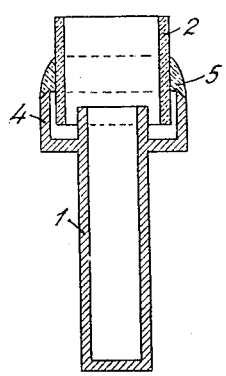
Figure 2:
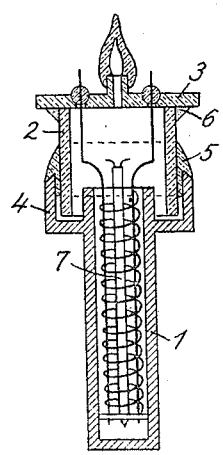

The invention is in the nature of an improvement upon this method and is described hereafter by way of example, reference being had to the accompanying drawing in which Fig. 1 is a sectional view of part of a vessel of an electron tube and illustrates a step of the novel method. Fig. 2 is a partially diagrammatic sectional view of the finished tube.

The vessel shown by way of example comprises a cylindrical metal part 1 made of copper, for instance, and constituting the anode, and further comprises a ceramic sleeve 2 and a ceramic cover 3. Sleeve 2 is seated in a cup-shaped extension 4 of part 1. Body 1, 4 and sleeve 2 are fastened to each other by a seal 5 that may be of glass, for instance. Cover 3 and sleeve 2 are interconnected by a seal 6. Cover 3 carries an electrode system 7 which comprises the cathode and a grid.

In accordance with the invention body 1, 4 and sleeve 2 are united with each other by a method such as follows.

Sleeve 2 is inserted in part 4 to such extent only as represented in Fig. 1 by way of example. The annular joint of the two is in a well known manner covered with a suitable sealing material 5, such as glass. While this material is still soft the sleeve 2 is moved farther or entirely into the extension 4. Hereby so much of the sealing material 5 is caused to enter the space between the parts 2, 4 that the edge portion of the extension 4, already coated outside with sealing material, is now coated also inside therewith, a perfect sealing being obtained in this way. In order clearly to illustrate this result, the space between the parts 2, 4 is in the drawing assumed to be larger than it is or must be in reality.

What is claimed is:

1. The method of manufacturing discharge vessels having metallic and ceramic wall portions comprising the following steps; assembling said portions so that they meet in a joint, placing a molten seal on the outside of the joint, and moving one portion past the other to force the seal into the joint.

2. The method of manufacturing discharge vessels having metallic and ceramic wall portions comprising the following steps; placing one of said portions within the other to form an overlapping telescoping joint, applying a molten seal to the joint, and further telescoping said portions to force the seal between the overlapping parts within the joint.

OTTO BAIER.